US012106636B2

(12) United States Patent
Choung et al.

(10) Patent No.: US 12,106,636 B2
(45) Date of Patent: Oct. 1, 2024

(54) SYSTEM AND METHOD FOR ENABLING WAGERING EVENT BETWEEN SPORTS ACTIVITY PLAYERS WITH STORED EVENT METRICS

(71) Applicant: Artificial Intelligence Experiential Technologies, LLC, Lewisville, TX (US)

(72) Inventors: William Choung, Plano, TX (US); Daniel Sahl, Henderson, NV (US)

(73) Assignee: Artificial Intelligence Experiential Technologies, LLC, Lewisville, TX (US)

( * ) Notice: Subject to any disclaimer, the term of this patent is extended or adjusted under 35 U.S.C. 154(b) by 0 days.

(21) Appl. No.: 18/618,994

(22) Filed: Mar. 27, 2024

(65) Prior Publication Data

US 2024/0249599 A1 Jul. 25, 2024

Related U.S. Application Data

(63) Continuation of application No. 17/741,330, filed on May 10, 2022, which is a continuation-in-part of application No. 17/062,565, filed on Oct. 3, 2020, now Pat. No. 11,328,559.

(51) Int. Cl.
*G07F 17/32* (2006.01)

(52) U.S. Cl.
CPC ...... *G07F 17/3288* (2013.01); *G07F 17/3209* (2013.01); *G07F 17/3225* (2013.01)

(58) Field of Classification Search
CPC ............. G07F 17/3288; G07F 17/3209; G07F 17/3225
See application file for complete search history.

(56) References Cited

U.S. PATENT DOCUMENTS

| | | | | |
|---|---|---|---|---|
| 5,288,993 | A | 2/1994 | Bidiville et al. | |
| 5,703,356 | A | 12/1997 | Bidiville et al. | |
| 5,775,996 | A | 7/1998 | Othmer et al. | |
| 5,820,463 | A | 10/1998 | O'Callaghan | |
| 6,321,128 | B1 | 11/2001 | Costin, IV | |
| 2002/0004764 | A1 | 1/2002 | Stolze et al. | |
| 2002/0026321 | A1 | 2/2002 | Faris et al. | |
| 2004/0241630 | A1 | 12/2004 | Hutchon et al. | |
| 2007/0074504 | A1 | 4/2007 | Driscoll et al. | |
| 2012/0306892 | A1 | 12/2012 | Hui | |
| 2014/0266160 | A1* | 9/2014 | Coza | A63B 47/008 324/207.11 |
| 2015/0328516 | A1 | 11/2015 | Coza et al. | |
| 2016/0071355 | A1 | 3/2016 | Morrison et al. | |
| 2016/0158640 | A1 | 6/2016 | Gupta et al. | |
| 2018/0117436 | A1 | 5/2018 | Coza et al. | |
| 2018/0158286 | A1 | 6/2018 | Strause et al. | |

(Continued)

*Primary Examiner* — Ronald Laneau
(74) *Attorney, Agent, or Firm* — Foley & Lardner LLP

(57) ABSTRACT

Individual sports event activities are recorded along with metric results of individual or collective results of the activities. The data from these recordings and metrics are provided to a central gaming server. Individual players offer wagers of value to be used in competition against other individual or groups of players. The central gaming server compares the metrics of at least two individual players that have offered wagers of values and determines a winning individual player based on the comparison of metrics.

20 Claims, 4 Drawing Sheets

(56) References Cited

U.S. PATENT DOCUMENTS

| | | | | |
|---|---|---|---|---|
| 2019/0358492 | A1* | 11/2019 | Coza | G09B 19/0038 |
| 2019/0388791 | A1 | 12/2019 | Lapoint | |
| 2020/0038742 | A1 | 2/2020 | Van Wagoner et al. | |
| 2020/0061435 | A1* | 2/2020 | Huston | H04W 12/06 |
| 2020/0074181 | A1 | 3/2020 | Chang et al. | |
| 2022/0108589 | A1* | 4/2022 | Choung | G07F 17/3267 |
| 2023/0074999 | A1* | 3/2023 | Gupta | G07F 17/3239 |

* cited by examiner

SYSTEM AND METHOD FOR ENABLING WAGERING EVENT BETWEEN SPORTS ACTIVITY PLAYERS WITH STORED EVENT METRICS

CROSS-REFERENCE TO RELATED PATENT APPLICATIONS

This Application is a Continuation of U.S. Non-Provisional application Ser. No. 17/741,330, filed May 10, 2022, which is a Continuation-in-Part of U.S. Non-Provisional application Ser. No. 17/062,565, filed Oct. 3, 2020, the disclosures of which are hereby incorporated by reference in their entirety.

BACKGROUND

Field of the Invention

The present invention relates to the fields of wagering, wagering on recorded personal physical activities, and the creation of a wagering environment in a remote gaming server that compares metrics from recorded personal physical activities.

Background of the Art

Human beings have competed in widely diverse ways for both tangible and intangible objects of need and desire. Such objects of need or desire have included: food; shelter; land; rewards, prizes, natural resources; fame; fortune; diversion or recreation such as sports and games.

While the nature of man appears to not have changed fundamentally over the course of time, it is clear that his choice of tools and weapons have changed in step with his increase in technological skill and knowledge.

In the late 1960's, the globally-extensive information infrastructure, now referred to as the Internet, was developed by the United States Government as a tool for national defense and survival in world of intense global competition and military struggle. Ironically, some thirty years later, with the technological development of the HyperText Transport Protocol (HTTP), the HyperText Markup Language (HTML), and the Domain Name System (DNS), a globally-extensive hyper-linked database referred to as the World Wide Web (WWW) has quickly evolved upon the infrastructure of the Internet. By virtue of the WWW, billions and even trillions of information resources, located on millions of computing systems at different locations, have been linked in complex ways serving the needs and desires of millions of information resource users under the domains .net, .edu, .gov, .org, .com, .mil, etc. of the DNS.

The overnight popularity and success of the WWW can be attributed to the development of GUI-based WWW browser programs which enable virtually any human being to access a particular information resource (e.g. HTML-encoded document) on the WWW by simply entering its Uniform Resource Locator (URL) into the WWW browser and allowing the HTTP to access the document from its hosting WWW information server and transport the document to the WWW browser for display and interaction. The development of massive WWW search engines and directory services has simplified finding needed or desired information resources using GUI-enabled WWW browsers.

A consequence of the WWW is that the GUI-based WWW browser and underlying infrastructure of the Internet (e.g. high-speed IP hubs, routers, and switches) has been to provide human beings world over with a new set of information-related tools that can be used in ever expanding forms of human collaboration, cooperation, and competition.

WWW-enabled applications have been developed, wherein human beings engage in either a cooperative or competitive activity that is constrained or otherwise conditioned on the variable time. Recent examples of on-line or Web-enabled forms of time-constrained competition include: on-line or Internet-enabled purchase or sale of stock, commodities or currency by customers located at geographically different locations, under time-varying market conditions; on-line or Internet-enabled auctioning of property involving competitive price bidding among numerous bidders located at geographically different locations; and on-line or Internet-enabled competitions among multiple competitors who are required to answer a question or solve a puzzle or problem under the time constraints of a clock, for a prize and/or an award. There are websites where strategic board games (e.g., Boardgamearena.com), poker (e.g., pokernet.com), duplicate bridge (Bridgebaseonline.com), and other types of competitive events.

In some of the above Internet-supported applications or processes, there currently exists an inherent unfairness among the competitors due to at least six important factors, namely: (1) the variable latency of (or delay in) data packet transmission over the Internet, dependent on the type of connection each client subsystem has to the Internet infrastructure; (2) the variable latency of data packet transmission over the Internet, dependent on the volume of congestion encountered by the data packets transmitted from a particular client machine; (3) the vulnerability of these applications to security breaches, tampering, and other forms of manipulation by computer and network hackers; (4) the latency of information display device used in client subsystems connected to the Internet; (5) the latency of information input device used in client subsystems connected to the Internet; (6) the latency of the central processing unit (CPU) used in the client machine; and (7) the relative physical or mental ability of competitors.

The first six limitations or unfairness factors are technical issues that can be address by some advances in technology. As larger and larger numbers of competitors are involved in a time-constrained competition, it becomes more and more likely that there will be a tie between two or more competitors. Typically, it is preferable to avoid ties and be able to identify a single competitor as the winner. A time-constrained competition system intended to manage extremely large numbers of competitor must be able to resolve the time of the responses produced by such competitors in order to avoid or reduce the occurrence of ties.

Regarding the third unfairness factor, it is important to point out that each of the above-described time-constrained forms of Internet-supported competition are highly vulnerable to security breaches, tampering, and other forms of intentional network disruption by computer and network hackers. Although the use of a local clock insures fairness, it also raises a potential security problem with the system. Theoretically, an unscrupulous competitor could intercept and modify communications between the client and server, thereby falsifying the timestamps and gaining an unfair advantage over other competitors. Alternatively, an unscrupulous competitor could modify the local clock, either through software or hardware means, or interfere with the clock synchronization procedure, again gaining an unfair advantage over other competitors. The ordinary encryption/decryption techniques suggested in U.S. Pat. No. 5,820,463 are simply inadequate to prevent cheating or violation of underlying rules of fairness associated with such time-constrained forms of Internet-supported or Internet-enabled competition.

Regarding the fourth unfairness factor, it is important to point out that different types of information display devices have faster refresh rates. In the time-constrained competitions described above, the most common information display device used on client subsystems is the cathode ray tube (CRT) display monitor. In a CRT display monitor, the images presented to the user are drawn by an electron beam onto the screen from top to bottom, one scanline at a time. When the electron beam reaches the bottom, it must then travel back to the top of the monitor in order to prepare to output the first scanline again. The period in which the beam returns to the top of the screen is known as the retrace period. The overall frequency of the screen refreshing and retrace cycle is determined by the frequency of the vertical synchronization pulses in the video signal output by the computer. This frequency is often referred to as the vertical sync rate. In most monitors this rate ranges from 60 to 150 Hz. Unless the vertical redraw time is synchronized with the desired competition "start-time" in time-constrained competition at hand, a random error in the start time is created due to the uncertainty of the actual time the query, bid, price or other information element will be displayed on the display screen of a particular client system used to participate in the time-constrained competition at hand. This "information display latency" error can be as much as ten milliseconds or more depending on the vertical sync rate, and is in addition to any other errors in the start-time caused by network latency, computer processing time, and other factors. Therefore, real-time, player-versus-player competitions online can be significantly impacted by apparatus parameters and not by the skill or effort of the players.

U.S. Pat. No. 5,775,996 addresses the problem of information display latency by providing a method and apparatus for synchronizing the video display refresh cycles on multiple machines connected to an information network. This method involves using methods similar to NTP (network timekeeping protocol) or other clock synchronization algorithms in order to synchronize both the phase and frequency of the vertical refresh cycle on each display. First, the monitors are set to the same frequency using standard video mode setting functions available in the operating system. Next, the phase of the cycle is adjusted by repeatedly switching in and out of "interlaced" mode. Since the interlaced modes have different timings than the standard modes, switching briefly into an interlaced mode will affect the phase of the refresh cycle.

Regarding the fifth "unfairness factor", it must be pointed out that different types of information input devices have faster information input rates. In the time-constrained competitions described above, the most common information input device used on today's client subsystems is the manually-actuated keyboard. In response to manual keystrokes by the competitor at his or her client machine, and electronic scanning operations, the keyboard generates a string of ASCII characters that are provided as input to the client system bus and eventually read by the CPU in the client machine. Only when the desired information string is typed into the client machine, and the keyboard return key depressed, will the keyed-in information string be transmitted to the information server associated with the time-constrained competition. Those with physical handicaps, and those using low-speed information input devices, will have their responses, commands and/or instructions transmitted with greater latency, and therefore arriving at the information server at a later time, assuming all other factors maintained constant for all competitors. In short, depending on the type of input device used, a competitor participating in an Internet-supported time-constrained competition can be put at a serious disadvantage in comparison with those using high-speed information input devices and high-speed processors. When competing against androidal competition (e.g. thinking machines), as currently used in electronic-based securities and commodity trading, an d electronic-based auctions, human competitors are placed at a great disadvantage in rapidly changing markets and fast-paced auctions.

Consequently, the six "unfairness" factors discussed above compromises the integrity any form of time-constrained competition supported on or otherwise enabled over the Internet. This must be satisfactorily resolved in order ensure fundamental principles of fairness and fair play that have come to characterize the systems of government, justice, securities, commodities and currency market trading, sportsmanship, and educational testing, in the United States of America and abroad.

Published US Patent Application Document No. 20020026321 (Faris) describes one solution addressing some of these issues with an improved system and method of fairly and securely enabling timed-constrained competitions over the Internet among millions of competitors while compensating for the variable network communication latencies experienced by client machines used by the competitors.

The system employs globally time-synchronized Internet information servers and client machines in order to synchronize the initial display of each invitation to respond (e.g. stock price to buy or sell, query to answer, or problem to solve) on a client machine so each competitor can respond to the invitation at substantially the same time, regardless of his or her location on the planet, or the type of Internet-connection used by his or her client machine. Also, by using globally time-synchronized client machines, each competitor's response is securely time and space stamped at the client machine to ensure that competitor responses are resolved within microsecond accuracy.

US 2007/0074504 (Maul) describes an interactive simulated golf competition performed online.

US 2020/0074181 (Chang) describes a data processing system for generating interactive user interfaces and interactive game systems based on spatiotemporal analysis of video content.

US 2018/0158286 (Strauss) evidences a virtual world of sports competition with an integrated wagering/betting system.

US 2019/0388791 (Lapointe) evidences systems and methods for providing sports performance data over a wireless network.

A non-golfer might believe that in golf, the USGA handicap system would balance out golfers of all skill levels. The USGA even states that "Thanks to the USGA Handicapping System, all golfers can compete on an equal basis. The USGA Course Rating System ensures that golf courses are rated in relation to all other courses. The USGA Slope System adjusts a player's USGA Handicap Index according to the difficulty of a course. As a result, no matter who golfers play with—or where they play—they can enjoy a fair game." This is not accurate when there is a contest of skill sets, such as total driving distance, carry with a driver, accuracy with a driver and other single shot specific events.

In U.S. Pat. No. 6,321,128 (Costin I V et al.), a virtual golf game is described, detailing “A system and method adequately and accurately compares golf scores from two different courses by comparing the relative difficulty of each course played and the relative ability of the players in conjunction with a selected Tournament course, which may be an imaginary or physical course, for determining the winner of a match or game of golf.” While this system appears to be considering a similar solution to the competition of golfers on separate golf courses, it is unnecessary to involve an additional, separate Tournament course for adequate and equitable comparisons. Furthermore, by making one possibility of the suggested Tournament course be an imaginary course, the reliable adherence to generally accepted golfing standards set forth by the USGA for rating golf courses is discarded; imaginary courses cannot be accurately and equitably rated with real golf courses, nor can they be physically played upon. In addition, this patent further states “after each player has played a game of golf, the scores are arranged by hole length for each given course; after which the scores are transferred to the Tournament course which has also been arranged by hole length, shortest to longest.” The suggested method involved for the posting of scores does not take place in real-time, nor is data communicated in real-time via wireless device through a real-time wireless Network; instead the posting of scores takes place “after each player has played a game of golf”.

Golf Simulator Background

There are numerous modalities of providing golf simulators and enabling the generation of metrics for use in the present invention. These existing systems may be connected into the system with additional content of handicaps, wager amounts, player identification and the verification and security systems discuss above.

These systems include by way of non-limiting examples, the following US Patent Documents:

US Document No. 20040241630 (Hutchon) which provides a golf simulator comprising a launch area facing a screen at which the ball is driven and used to display part of a golf course. Sensors detect the impact of a ball on the screen, and/or flight towards it, and/or club head trajectory. The launch area is a playing surface panel tiltable by a displacement device, to provide a desired slope angle $\alpha$ and slope direction $\beta$ relative to a driving direction. A computer is connected to the sensors and displacement device, and programmed to control display of the course, based on its topography, and position of the launch area, and compute an estimated ball trajectory, ball lie based on the estimated trajectory and landing zone topography. The computer then controls the screen display and displacement device so that the next drive can be played from a realistic lie.

US Documents Nos. 20040248661 and 20060270483 (O’Mahony) disclose a practice golf swing device which permits the swinger of a golf club to hit a variable height replica golf ball that is fixedly attached to a universally pivoting arm (swivel arm) that moves in direct proportion to the swing path and speed of the golf club. The motion thus initiated in the swivel arm may be measured at the base of the arm (knuckle ball) using an optical/digital sensing output as disclosed in U.S. Pat. Nos. 5,288,993 and 5,703,356 with this measurement being computed so as to numerically or graphically depict the movement. This graphical depiction may be viewed as a pictorial view of a golf ball in flight along the path that would be expected had the ball been struck by a golf ball with the same force and direction that is imparted to the replica golf ball, which is attached to the pivot arm of the device. The apparatus has a self-zeroing capability that provides an identical “at rest” position prior to impact. Thus, the only force that can affect the measured movement of the arm and the replica golf ball is the force applied directly to the ball at the point in time of impact.

US Document No. 20120306892 (Rongqing) describes a mobile target screen for ball game practicing and simulation. Tow force sensors are mounted at each of the four corners of the frame which holds a target screen. Measurements form the force sensors are used to compute and display a representation of ball speed, the location of the ball on the target screen, and the direction of the ball motion. These parameters can be used to predict the shooting distance and the landing position of the ball. It also provides enough information to predict the trajectory of the ball which can be displayed on a video screen which communicates with the sensors through a wireless transceiver.

US Document No. 20200038742 (Van Wagoner) describes systems that relate to simulation, generally, and in some embodiments, more specifically to simulating a flight path of a golf ball. In such embodiments, a computer may be adapted to determine a first trajectory of the golf ball based on one linear expression; determine variations based on a flight path of the golf ball according to a first plane and a second plane, the first plane and second plane having orthogonality; adjust the first trajectory based on the variations; and provide a virtual golf ball with a virtual flight path based on the adjusted trajectory. A golf simulator, comprising: an image capture system comprising a first camera and a second camera, wherein the first camera and the second camera are adapted to be positioned in a stereographic arrangement; and a computer, wherein the computer is adapted to generate simulation data of a golf ball flight path responsive to a club swing event by: determining a first trajectory of the golf ball based on a linear expression; determining variations responsive to a flight path of the golf ball according to a first plane and a second plane, the first plane and second plane having orthogonality; adjusting the first trajectory responsive to the variations; and generating simulation data indicative of a virtual golf ball with a virtual flight path responsive to the adjusted trajectory.

Each document cited in this application are incorporated by reference in their entirety.

The seventh inequality factor can be addressed by another modality that also overcomes many of the technical and performance inequalities created by the use of different apparatus. That new modality is addressed in the practice of the present invention and its description below.

SUMMARY OF THE INVENTION

Individual sports event activities are recorded along with metric results of individual or collective results of the activities. The data from these recordings and metrics are provided to a central gaming server. Individual players offer wagers of value to be used in competition against other individual or groups of players. The central gaming server compares the metrics of at least two individual players that have offered wagers of values and determines a winning individual player based on the comparison of metrics.

DETAILED DESCRIPTION OF THE INVENTION

Figure 1:
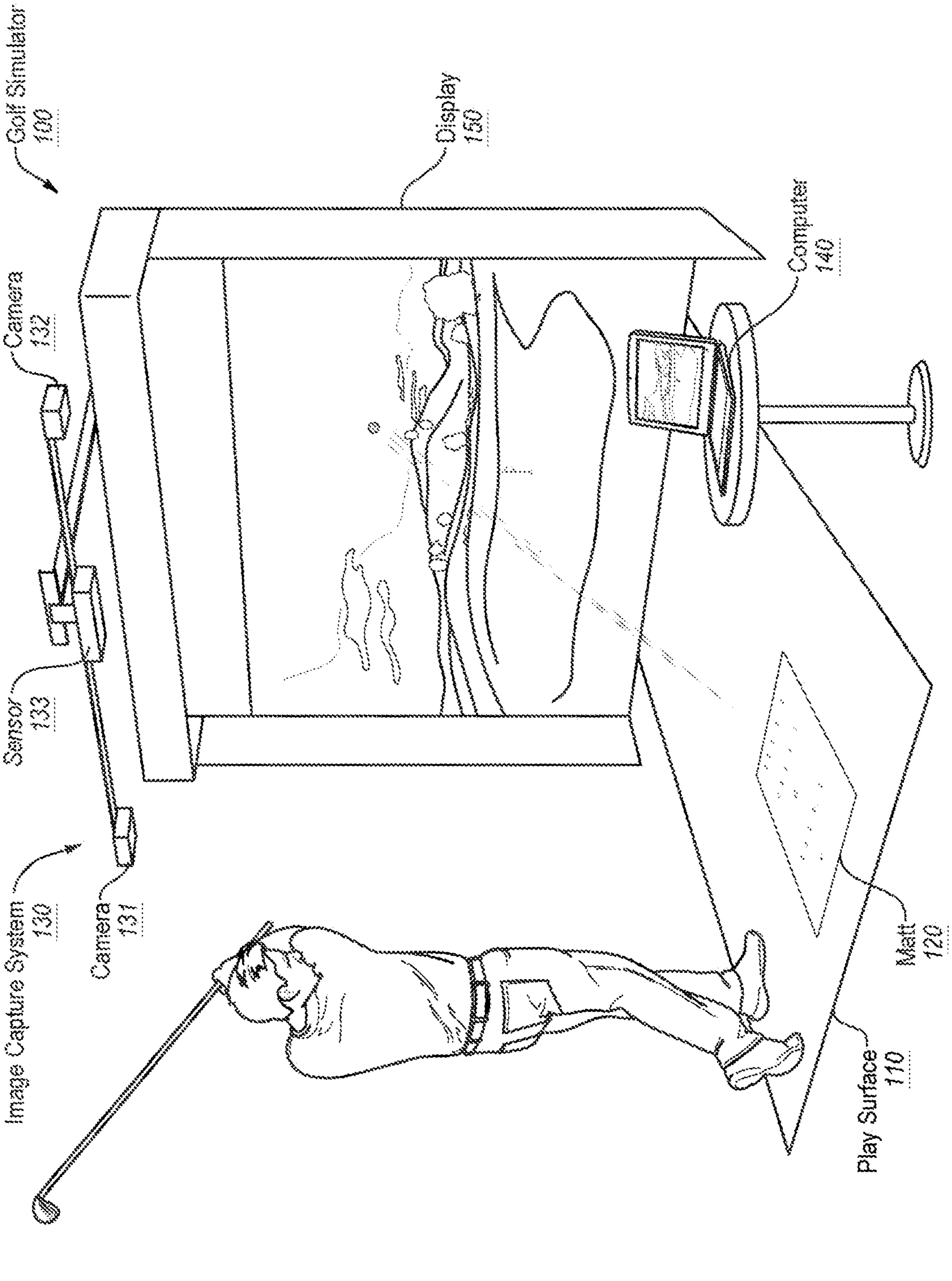
FIG. 1 is an isometric view of a golf simulator, in accordance with an embodiment of the disclosure.

A method of and system for executing a wagering event between at least two players may include:

- providing a visual recording system having a range of view that encompasses a player's physical activities in executing a physical sport activity selected from the group consisting of golf, bowling, archery, basketball shooting, darts, hitting a ball with a bat, club or racquet, and fixed equipment exercise activities. The at least two players is typically two players, but party groups of friends or groups in a virtual league, or just distally associated groups or locations (e.g., groups in a bar in Wisconsin versus a group in a bar in London, England) can set up matches that are not live (because of the time differentials) and can socially or regularly compete over periods of time. Groups need not be limited in total number, but groups of fewer than 20 on each team would be preferred. (Competitions between more than 2 people do not have to occur in groups. For example, there could be a tournament-like competition where 10 or even 100 individuals with no connection to one another compete in this system across multiple networked devices with the top 10 or top 5 players winning a portion of the prize pool)

At each location where a player is located, a recording is made of a single sport activity event or a series of sport activity events for a single sport activity for a single player and metric results for that single sport activity event. After the recording, the local system will then be transmitting as data the recording of the single sport activity event or series of sport activity events and the metric results for the single player to a central gaming server, the gaming server storing the data with an electronically readable name associated with the single player.

A second single sport activity player (not necessarily and not likely to be at the same time) executes a same single sport activity with a same or different visual recording system to provide a second single sport activity player recording and metric results.

The second single sport activity player location will then be transmitting as data the recording of the second single sport activity event or series of sport activity events and the metric results for the second single player to a central gaming server, the gaming server storing the data with an electronically readable name associated with the single player.

Each of the single sport activity player and the second sport activity player agrees to a competitive wager (e.g., in monetary value, beverage costs, commercial value, etc.) for value in comparing individual metrics for the single sport activity player and the second sport activity player for the single sport activity event.

The central gaming server then compares the metrics for the single sport activity player and the second sport activity player for the single sport activity event and the central game server determining by a direct comparison of the individual metrics a winner of the value of the wager.

The central game server should date stamp each transmission of data and associates that date stamp as well as the transmitted data with respective sport activity players. To even out competition among players of different abilities, the metrics should be compared using a stored handicapping value for the single sport activity player and the second single sport activity player. The handicapping may include values of at least one of distance, speed, accuracy, time and score. For example, in a golf driving competition, players based on past performances may have yardage added or subtracted from actual performance, either in absolute terms and distances or in proportions of distances between the average drives, for example) two players competing for distance. For example, if there are two players with a statistical background of results of 223 yards average driving distance, and another with a statistical background of results of 187 yards average driving distance (a difference of 36 yards), the event between the two could be handicapped by adding 45% of the difference to the shorter hitting player and reducing the measured distance of the longer hitter by 45%. In this case, adding and subtracting 16.2 yards from each player. This would leave a much more fair differential of 3.6 yards statistical difference between the two players. This still offers the better (longer hitting) player a slight statistical advantage, but significantly equalizes the competition. Other statistical handicapping percentages (even add the advantage to the less skilled player at more than +50% differentials could be used.

The method may be preferred wherein the single sport activity event comprises golf and the visual recording also includes visual or electronic measurement of golf club head speed and position at a moment of impact with a golf ball. In this method, the single sport activity event comprises golf and the visual recording is converted into the transmitted data to include a metric based on an amount of energy transferred from a golf club head to a golf ball, an amount of spin on the golf ball immediately after impact of the golf ball with the golf club head, an angle at which the golf ball takes off after separation from the golf club head, how far the golf ball would travel in air under defined ambient conditions, ball speed immediately after the golf ball leaves the golf club head, the sped of the golf club head at impact, an amount of loft on the golf club head face at a time of impact with the golf ball, an amount of loft on the golf club head face at the time of impact with the golf ball, and a face angle for the golf club head face. The method may include the central game server making a comparison of multiple events of transmitted data for a single sport activity player to assure that repeated data is not used in multiple wagering events. The cycling may be fixed equipment exercise activity and sensors are present on a stationary cycling apparatus to measure pedal speed, pedal resistance and time. The method may include dart throwing at a target which is used as the physical activity and metrics transmitted include a score attained by individual darts on a dart board. The dart board may be electronic or physical with the image of the physical dart board being used to capture final dart position and the game server determining points or accuracy metrics.

The actual competitive players and the competitive player individual event metrics used in the method may be chosen by the central game server. The server may randomly select the first single sport activity player recording and metric results and the second single sport activity player recording and metric results to compete against each other. This random selection by the central game server should be limited within ranges of handicapped abilities of the first single sport activity player and the second single sport activity player. The selection of the first single sport activity player and the second single sport activity player is commanded or identified to the central game server by the first single sport activity player and the second single sport activity player.

The above cited Lapointe Patent offers some insight into technology that can be incorporated into the present methods and systems, with alteration of the software and operation making the present system more efficient, more flexible and enabling greater accuracy in competitive events.

Technical Enablement

Lapointe illustrates an example implementation of the video player application. The video player application may include a GUI module, an integration module, an access management module, a video transformation module, a time transformation module, and a data management module. The video player application may include additional or alternative modules not discussed therein.

In some embodiments, the GUI module receives commands from a user and displays video content, including augmented video content, to the user via the user interface. In embodiments, the GUI module displays a menu/selection screen (e.g., drop down menus, selection elements, and/or search bars) and receives commands from a user corresponding to the available menus/selection items via a user via the user interface. For example, the GUI module may receive an event selection via a drop-down menu and/or a search bar/results page. In embodiments, an event selection may be indicative of a particular sport and/or a particular match. In response to an event selection, the GUI module may provide the event selection to the integration module. In response, the GUI module may receive a video stream (of one or more video streams capturing the selected event) from the video transformation module and may output a video corresponding to the video feed via the user interface. The GUI module may allow a user to provide commands with respect to the video content, including commands such as pause, fast forward, and rewind. The GUI module may receive additional or alternative commands, such as "make a clip," drill down commands (e.g., provide stats with respect to a player, display players on the playing surface, show statistics corresponding to a particular location, and the like), switch feed commands (e.g., switch to a different viewing angle), zoom in/zoom out commands, select link commands (e.g., selection of an advertisement), and the like.

The integration module receives an initial user command to view a particular sport or game and instantiates an instance of a video player (also referred to as a "video player instance"). In embodiments, the integration module receives a source event identifier (ID), an access token, and/or a domain ID. The source event ID may indicate a particular game (e.g., distance golf, dart accuracy, tiddlywinks run, bowling score, tennis serves, etc.). The access token may indicate a particular level of access that a user has with respect to a game or league (e.g., the user may access advanced content may include multi-view feed). The domain ID may indicate a league or type of event. In embodiments, the integration module may instantiate a video player instance in response to the source event ID, the domain ID, and the access token. The integration module may output the video player instance to the access management module. In some embodiments, the integration module may further output a time indicator to the access management module. A time indicator may be indicative of a time corresponding to a particular frame or group of frames within the video content. In some of these embodiments, the time indicator may be a wall time. Other time indicators, such as a relative stream (e.g., 10 seconds from t=0), may be used, however.

The access management module receives the video player instance and manages security and/or access to video content and/or data by the video-recorded player from a multimedia system. In embodiments, the access management module may expose a top layer API to facilitate the case of access to data by the video-recorded player instance. The access management module may determine the level of access to provide the video-recorded player instance based on the access token. In embodiments, the access management module implements a single exported SDK that allows a data source (e.g., multimedia servers) to manage access to data. In other embodiments, the access management module implements one or more customized exported SDKs that each contain respective modules for interacting with a respective data source. The access management module may be a pass through layer, whereby the video-recorded player instance is passed to the video transformation module.

In some embodiments, the video transformation module receives the video player instance and obtains video feeds and/or additional content provided by a multimedia server (or analogous device) that may be displayed with the video encoded in the video feeds. In some embodiments, the video transformation module receives the video content and/or additional content from the data management module. In some of these embodiments, the video transformation module may receive a smart pipe that contains one or more video feeds, audio feeds, data feeds, and/or an index. In some embodiments, the video feeds may be time-aligned video feeds, such that the video feeds offer different viewing angles or perspectives of the event to be displayed. In embodiments, the index may be a spatio-temporal index. In these embodiments, the spatio-temporal index identifies information associated with particular video frames of a video and/or particular locations depicted in the video frames. In some of these embodiments, the locations may be locations in relation to a playing surface (e.g., at the one-hundred and fifty-yard marker from the tee box or at the free throw line) or defined in relation to individual pixels or groups of pixels. It is noted that the pixels may be two-dimensional pixels or three-dimensional pixels (e.g., voxels). The spatio-temporal index may index participants on a playing surface (e.g., players on a basketball court), statistics relating to the participants (e.g., Player A has driven ball 232 yards), statistics relating to a location on the playing surface (e.g., Team A has made 30% of three-pointers from a particular area on a basketball court), advertisements, score bugs, graphics, and the like. In some embodiments, the spatio-temporal index may index wall times corresponding to various frames. For example, the spatio-temporal index may indicate a respective wall time for each video frame in a video feed (e.g., a real time at which the frame was captured/initially streamed).

The video transformation module receives the video feeds and the index and may output a video to the GUI module. In embodiments, the video transformation module is configured to generate augmented video content and/or switch between different video feeds of the same event (e.g., different camera angles of the event). In embodiments, the video transformation module may overlay one or more GUI elements that receive user selections into the video being output. For example, the video transformation module may overlay one or more visual selection elements over the video feed currently being output by the GUI module. The visual selection elements may allow a user to view information relating to the event depicted in the video feed, to switch views, or to view a recent highlight. In response to the user providing a command via the user interface of the client device, the video transformation module may augment the currently displayed video feed with augmentation content, switch the video feed to another video feed, or perform other video transformation related operations.

The video transformation module may receive a command to display augmentation content. For example, the video transformation module may receive a command to display information corresponding to a particular location (e.g., a pixel or group of pixels) and a particular frame. In response to the command, the video transformation module may reference the spatio-temporal index to determine an object (e.g., a player) that is located at the particular location in the particular frame. The video transformation module may retrieve information relating to the object. For example, the video transformation module may retrieve a name of a player or statistics relating to a player or a location on the playing surface. The video transformation module may augment the current video feed with the retrieved content. In embodiments, the video transformation module may request the content (e.g., information) from the multimedia server via the data management module. In other embodiments, the content may be transmitted in a data feed with the video feeds and the spatio-temporal index. In response to receiving the requested content (which may be textual or graphical), the video transformation module may overlay the requested content on the output video. The video transformation module may determine a location in each frame at which to display the requested data. In embodiments, the video transformation module may utilize the index to determine a location at which the requested content may be displayed, whereby the index may define locations in each frame where specific types of content may be displayed. In response to determining the location at which the requested content may be displayed, the video transformation module may overlay the content onto the video at the determined location.

In some embodiments, the video transformation module may receive a command to switch between video feeds in response to a user command to switch feeds. In response to such a command, the video transformation module switches the video feed from the current video feed to a requested video feed, while maintaining time-alignment between the video (i.e., the video continues at the same point in time but from a different feed). For example, in streaming a particular golf shot and receiving a request to change views, the video transformation module may switch from a side view to behind the driver view without interrupting the action of the swing. The video transformation module may time align the video feeds (i.e., the current video feed and the video feed being switched to) in any suitable manner. In some embodiments, the video transformation module obtains a wall time from the time transformation module corresponding to a current frame or upcoming frame. The video transformation module may provide a frame identifier of the current frame or the upcoming frame to the video transformation module. In embodiments, the frame identifier may be represented in block plus offset form (e.g., a block identifier and a number of frames within the block). In response to the frame identifier, the time transformation module may return a wall time corresponding to the frame identifier. The video transformation module may switch to the requested video feed, whereby the video transformation module begins playback at a frame corresponding to the received wall time. In these embodiments, the video transformation module may obtain the wall time corresponding to the current or upcoming frame from the time transformation module, and may obtain a frame identifier of a corresponding frame in the video feed being switched to based on the received wall time. In some embodiments, the video transformation module may obtain a "block plus offset" of a frame in the video feed being switched to "based on the wall time." The block plus offset may identify a particular frame within a video stream as a block identifier of a particular video frame and an offset indicating a number of frames into the block where the particular video frame is sequenced. In some of these embodiments, the video transformation module may provide the video transformation module with the wall time and an identifier of the video feed being switched, and may receive a frame identifier in block plus offset format from the time transformation module. In some embodiments, the video transformation module may reference the index using a frame identifier of a current or upcoming frame in the current video feed to determine a time aligned video frame in the requested video feed. It is noted that while the "block plus offset" format is described, other formats of frame identifiers may be used without departing from the scope of the disclosure. In response to obtaining a frame identifier, the video transformation module may switch to the requested video feed at the determined time aligned video frame. For example, the video transformation module may queue up the requested video feed at the determined frame identifier. The video transformation module may then begin outputting video corresponding to the requested video feed at the determined frame identifier.

In some embodiments, the time transformation module receives an input time value in a first format and returns an output time value in a second format. For example, the time transformation module may receive a frame indicator in a particular format (e.g., block plus offset") that indicates a particular frame of a particular video feed (e.g., the currently displayed video feed of an event) and may return a wall time corresponding to the frame identifier (e.g., the time at which the particular frame was captured or was initially broadcast). In another example, the time transformation module receives a wall time indicating a particular time in a broadcast and a request for a frame identifier of a particular video feed. In response to the wall time and the frame identifier request, the time transformation module determines a frame identifier of a particular video frame within a particular video feed and may output the frame identifier in response to the request. The time transformation module may determine the output time in response to the input time in any suitable manner. In embodiments, the time transformation module may utilize an index corresponding to an event (e.g., the spatio-temporal index corresponding to an event) to determine a wall time in response to a frame identifier and/or a frame identifier in response to a wall time. In these embodiments, the spatio-temporal index may be keyed by frame identifiers and/or wall times, whereby the spatio-temporal index returns a wall time in response to a frame identifier and/or a frame identifier in response to a wall time and a video feed identifier. In other embodiments, the time transformation module calculates a wall time in response to a frame identifier and/or a frame identifier in response to a wall time. In some of these embodiments, each video feed may include metadata that includes a starting wall time that indicates a wall time at which the respective video feed began being captured/broadcast, a number of frames per block, and a frame rate of the encoding. In these embodiments, the time transformation module may calculate a wall time in response to a frame identifier based on the starting time of the video feed indicated by the frame identifier, the number of frames per block, and the frame indicated by the frame identifier (e.g., the block identifier and the offset value). Similarly, the time transformation module may calculate a frame identifier of a requested video feed in response to a wall time based on the starting time of the requested video feed, the received wall time, the number of frames per block, and the encoding rate.

In some embodiments, the time transformation module may be configured to transform a time with respect to first video feed to a time with respect to a second video feed. For example, the time transformation module may receive a first frame indicator corresponding to a first video feed and may output a second frame indicator corresponding to a second video feed, where the first frame indicator and the second frame indicator respectively indicate time-aligned video frames. In some of these embodiments, the time transformation module may utilize an index corresponding to an event (e.g., the spatio-temporal index corresponding to an event) to determine the second frame identifier in response to the second frame identifier. In these embodiments, the spatio-temporal index may be keyed by frame identifiers and may index frame identifiers of video frames that are time-aligned with the video frame referenced by each respective frame identifier. In other embodiments, the time transformation module calculates the second frame identifier in response to the first identifier. In some of these embodiments, the time transformation module may convert the first frame identifier to a wall time, as discussed above, and then may calculate the second frame identifier based on the wall time, as described above.

In some embodiments, the data management module requests and/or receives data from external resources and provides the data to a requesting module. For example, the data management module may receive the one or more video feeds from a multimedia server. The data management module may further receive an index (e.g., spatio-temporal index) corresponding to an event being streamed. For example, in some embodiments, the data management module may receive a smart pipe corresponding to an event. The data management module may provide the one or more video feeds and the index to the video transformation module. In embodiments, the data management module may expose one or more APIs of the video player application to external resources, such multimedia servers and/or related data servers (e.g., a server that provides game information such as player names, statistics, and the like). In some embodiments, the external resources may push data to the data management module. Additionally or alternatively, the data management module may be configured to pull the data from the external resources.

In some embodiments, the data management may receive requests for data from the video management module. For example, the data management module may receive a request for information relating to a particular frame identifier, a location within the frame indicated by a frame identifier, and/or an object depicted in the frame indicated by a frame identifier. In these embodiments, the data management module may obtain the requested information and may return the requested information to the video management module. In some embodiments, the external resource may push any information that is relevant to an event to the data management module. In these embodiments, the data management module may obtain the requested data from the pushed data. In other embodiments, the data management module may be configured to pull any requested data from the external resource. In these embodiments, the data management module may transmit a request to the external resource, whereby the request indicates the information sought. For example, the request may indicate a particular frame identifier, a location within the frame indicated by a frame identifier, or an object (e.g., a player) depicted in the frame indicated by the frame identifier. In response to the request, the data management module may receive the requested information, which is passed to video transformation module. This frame analysis capability can be a unique security component of the present invention. Different single player sport event submissions can be compared on a frame-by-frame basis (e.g., on at least 10, preferably at least 20 consecutive frames) to assure that event data submissions are not identical and therefore false.

In some embodiments, the data management module may be configured to obtain individual video feeds corresponding to an event. In some of these embodiments, the data management module may receive a request from the video transformation module for a particular video feed corresponding to an event. In response to the request, the data management module may return the requested video feed to the video transformation module. The video feed may have been pushed to the video application by an external resource (e.g., multimedia platform), or may be requested (pulled) from the external resource in response to the request. The machine learning model may include active learning and active quality assurance on a live spatiotemporal machine learning workflow in accordance with the various embodiments. The machine learning workflow includes a machine learning (ML) algorithm that may produce live and automatic machine learning (ML) classification output (with minimum delay) as well as selected events for human quality assurance (QA) based on live spatiotemporal data. In embodiments, the live spatiotemporal machine learning workflow includes the data from the human question and answer sessions that may then be fed back into a machine learning (ML) algorithm (which may be the same as the ML algorithm), which may be rerun on the corresponding segments of data, to produce a time-delayed classification output with improved classification accuracy of neighboring events, where the time delay corresponds to the QA process.

In some embodiments, the machine learning workflow includes data from the QA process being fed into ML training data to improve the ML algorithm models for subsequent segments such as improving on the ML algorithm and/or the ML algorithm. Live spatiotemporal data may be aligned with other imperfect sources of data related to a sequence of spatial-temporal events. In embodiments, the alignment across imperfect sources of data related to a sequence of spatial-temporal events may include alignment using novel generalized distance metrics for spatiotemporal sequences combining event durations, ordering of events, additions/deletions of events, a spatial distance of events, and the like.

In some embodiments, the systems and methods disclosed herein may include modeling and dynamically interacting with an n-dimensional point-cloud. By way of this example, each point may be represented as an n-sphere whose radius may be determined by letting each n-sphere grow until it comes into contact with a neighboring n-sphere from a specified subset of the given point-cloud. This method may be similar to a Voronoi diagram in that may allocate a single n-dimensional cell for every point in the given cloud, with two distinct advantages. The first advantage includes that the generative kernel of each cell may also be its centroid. The second advantage includes continuously changing shifts in the resulting model when points are relocated in a continuous fashion (e.g., as a function of time in an animation, or the like). In some embodiments, ten golf driving events by single individual players may be represented as ten nodes that are divided into two subsets of five teammates. At any given moment, each player's cell may be included in a circle extending in radius until it comes to be mutually tangent with an opponent's cell. By way of this example, players on the same team will have cells that overlap.

In some embodiments, the systems and methods disclosed herein may include a method for modeling locale as a function of time, some other specified or predetermined variable, or the like. In embodiments, coordinates of a given point or plurality of points are repeatedly sampled over a given window of time. By way of this example, the sampled coordinates may then be used to generate a convex hull, and this procedure may be repeated as desired and may yield a plurality of hulls that may be stacked for a discretized view of spatial variability over time. In embodiments, a single soccer player might have their location on a pitch sampled every second over the course of two minutes leading to a point cloud of location data and an associated convex hull. By way of this example, the process may begin anew with each two-minute window and the full assemblage of generated hulls may be, for example, rendered in a translucent fashion and may be layered so as to yield a map of the given player's region of activity.

In some embodiments, the systems and methods disclosed herein may include a method for sampling and modeling data by applying the recursive logic of a quadtree to a topologically deformed input or output space. In embodiments, the location of shots in a dart game may be sampled in arc-shaped bins, which may be partitioned by angle-of-incidence to the dart board and the natural logarithm of distance from the dart board, and, in turn, yielding bins which may be subdivided and visualized according to the same rules governing a rectilinear quadtree.

In some embodiments, the systems and methods disclosed herein may include a method for modeling multivariate point-cloud data such that location coordinates map to the location, while velocity (or some other relevant vector) may be represented as a contour map of potential displacements at various time intervals. In embodiments, a dart thrower tossing or [projecting a dart toward a target (especially with image capture of the player's arm and the dart trajectory) may be represented by a node surrounded by nested ellipses each indicating a horizon of displacement for a given window of time.

In some embodiments, the systems and methods disclosed herein may include a method for modeling and dynamically interacting with a directed acyclic graph such that every node may be rendered along a single line, while the edges connecting nodes may be rendered as curves deviating from this line in accordance with a specified variable. In embodiments, these edges may be visualized as parabolic curves wherein the height of each may correspond to the flow, duration, latency, or the like of the process represented by the given edge.

The methods and systems disclosed herein may include methods and systems for enabling a user to express preferences relating to display of video content and may include using machine learning to develop an understanding of at least one event, one metric related to the event, or relationships between events, metrics, venue, or the like within at least one video feed to determine at least one type for the event; automatically, under computer control, extracting the video content displaying the event and associating the machine learning understanding of the type for the event with the video content in a video content data structure; providing a user interface by which a user can indicate a preference for at least one type of content; and upon receiving an indication of the preference by the user, retrieving at least one video content data structure that was determined by the machine learning to have content of the type preferred by the user and providing the user with a video feed containing the content of the preferred type. These data may also be used to confirm the validity of submissions, as photoshopped and animation-enhanced images often do not obey the laws of nature and physics, and security can be added to the gaming system by evaluation conformation to those laws.

In embodiments, the user interface where recorded events are submitted, wagering amounts identified, and player identification established, confirmed and submitted is at least one of a mobile application, a browser, a desktop application, a remote control device, a tablet, a touch screen device, a virtual reality or augmented reality headset, and a smart phone. This is in addition to or as part of the image capture device recording the individual player sport action or event being recorded. In some embodiments, the user interface further comprises an element for allowing a user to indicate a preference as to how content will be presented to the user. In embodiments, the machine learning further comprises determining an understanding of a context for the event and the context is stored with the video content data structure. In embodiments, the user interface further comprises an element for allowing a user to indicate a preference for at least one context. In embodiments, upon receiving an indication of a preference for a context, video content corresponding to the context preference is retrieved and displayed to the user. In embodiments, the context comprises at least one of a) the presence of a preferred player in the video feed, b) a preferred matchup of players in the video feed, c) a preferred team in the video feed, and d) a preferred matchup of teams in the video feed. In embodiments, the user interface allows a user to select at least one of a metric and a graphic element to be displayed on the video feed, wherein at least one of the metric and the graphic is based at least in part on the machine understanding.

According to technology and methodologies enables in Published US Patent Document No. 20200012861, Chen, in some embodiments, the method of the present invention may further includes receiving a time-sequenced data feed corresponding to the filmed occurrence, wherein the time-sequenced data feed indicates information instances relating to different events that were recorded with respect the filmed occurrence. The method further includes time aligning the time-sequenced data feed with the broadcast video feed and the tracking video feed. In some embodiments, tracking the one or more respective pixel locations of an object detected in one or more respective broadcast video frames includes: detecting the object in a first broadcast video frame of the plurality of broadcast video frames; associating the object with a first pixel location in the first video frame; and tracking one or more other pixel locations of the object in one or more respective broadcast video frames of the plurality of broadcast video frames, In these embodiments, the first pixel location corresponds to one or more pixels occupied by the object in the first video frame, In some of these embodiments, tracking one or more respective spatial locations of the object includes: detecting the object in a first tracking video frame of the plurality of tracking video frame; associating the object in the first tracking video frame with a first spatial location in the first tracking video frame based on the frame of reference on which the tracking camera is calibrated; and tracking one or more other spatial locations of the object in one or more other tracking video frames of the plurality of tracking video frames, In these embodiments, the first spatial location defines spatial coordinates defined with respect to a playing surface corresponding to the sporting competition.

In some embodiments, the method further includes generating a smart pipe based on one or more broadcast video feeds, including the broadcast video feed, a time-sequenced data feed corresponding to the filmed occurrence that indicates information instances relating to different events that were recorded with respect to the filmed occurrence, and the spatio-temporal index, In some embodiments, the method further includes transmitting the smart pipe to a client device that requests to the broadcast video feed. In some embodiments, the method further includes transmitting the smart pipe to a device associated with a broadcaster of the filmed occurrence. In some embodiments, the filmed occurrence is a sporting competition, the object is a participant in the sporting competition, and the one or more information instances of the time-sequence data feed are statistics relating to the participant, In some embodiments, the filmed occurrence is a sporting competition taking place on a playing surface, In some of these embodiments, the frame of reference to which the tracking camera is calibrated is a marking on the playing surface, In some embodiments, the method further includes calibrating a position of the broadcast camera with respect to the frame of reference to which the position of the tracking camera is calibrated, In these embodiments, the camera may be calibrated by: detecting a stationary feature on the playing surface in the tracking video feed; determining an spatial location corresponding to the stationary feature based on the calibration of the tracking camera; detecting the stationary feature in a set of broadcast video frames of the broadcast video feed; determining respective pixel locations of the stationary feature in the respective broadcast video frames in the set of broadcast video frames; and calibrating a position of the broadcast video frame with respect to the frame of reference based on the spatial location of the stationary feature and the respective pixel locations.

In some embodiments, the one or more respective pixel locations indicate pixels in a respective broadcast video frame in which at least a portion of the object resides. In some embodiments, the one or more respective spatial locations indicate three dimensional locations of the object when depicted in a respective tracking video frame and are defined as x, y, z positions, In some embodiments, the one or more respective spatial locations indicate three dimensional locations of the object when depicted in a respective tracking video frame and are defined as voxels defined with respect to an area being filmed.

According to some embodiments of the present disclosure, a method is disclosed, In embodiments, the method includes receiving a broadcast video feed capturing a filmed occurrence, the broadcast video feed comprising a plurality of broadcast video frames captured by a broadcast camera, wherein the broadcast video feed is a video feed that is consumable by a client device, The method further includes receiving a tracking camera video feed corresponding to the filmed occurrence, the tracking camera video feed comprising a plurality of tracking video frames and being captured by a tracking camera having a position that is calibrated to a frame of reference, The method includes tracking one or more respective pixel locations of an object detected in one or more respective broadcast video frames of the broadcast video feed and tracking one or more respective spatial locations of the object based on one or more respective tracking video frames where the object is detected in the tracking video feed, The method also includes time-aligning the broadcast video feed with the tracking video feed based on the one or more respective pixel locations and the one or more respective spatial locations, The method also includes generating a spatio-temporal index corresponding to the filmed occurrence based on the time-alignment of the first broadcast video feed with the tracking video feed, wherein the spatio-temporal index indexes spatio-temporal information relating to objects detected in the broadcast video feed and/or the tracking video feed, The method further includes spatially aligning an augmentation item with respect to the object in a subset of the one or more broadcast video frames based on the spatio-temporal index, The method also includes generating an augmented video stream having one or more augmented video frames based on the subset of the one or more broadcast video frames and the spatial alignment of the augmentation item with respect to the object, wherein the augmentation item and the object are spatially aligned in the augmented video stream.

In some embodiments, the filmed occurrence is a sporting competition, and the object is a participant in the sporting competition and the one or more information instances are statistics relating to the participant that are obtained from a data feed corresponding to the sporting competition that is time aligned to the broadcast video feed.

In some embodiments, the method further includes associating an advertisement with a type of event that is detectable in the subset of broadcast video frames, In these embodiments, generating the augmented video stream further comprises: detecting an event depicted in a set of broadcast video frames of the broadcast video feed that is of the type of event associated with the advertisement, In some of these embodiments, generating the augmented video stream further comprises: detecting an event depicted in a set of broadcast video frames of the broadcast video feed that is of the type of event associated with the advertisement; and in response to detecting the event, augmenting at least one broadcast video frame with the advertisement.

In some embodiments, the augmentation item is an advertisement, and the advertisement is spatially associated with the object that is detected in the subset of broadcast video frames.

In some embodiments, the method further includes transmitting the augmented video stream to a client device.

According to some embodiments of the present disclosure, a method is disclosed, In embodiments, the method includes receiving a plurality of video feeds corresponding to a filmed occurrence, The method further includes for each video feed, encoding the video feed to obtain a plurality of encoded video segment files, each encoded video segment file corresponding to a different time interval of the video feed, The method also includes grouping video segment files from different video feeds into a plurality of temporal groups that share a common time interval, such that the video segment files in a respective temporal group share a beginning time boundary and an end time boundary, The method also includes performing one or more processing operations selected from a plurality of processing operations on a video segment file in at least one of the temporal groups to obtain a processed video feed, wherein the plurality of processing operations includes: a transcoding processing operation in which the video segment file is transcoded to obtain a transcoded video segment file; and an augmentation processing operation in which the segment file is augmented with augmentation content to produce an augmented video segment file, The method also includes time aligning the processed video feed and the plurality of video feeds to obtain time aligned video feeds based on the plurality of temporal groups, and providing the time aligned video feeds to a client device.

In some embodiments, the one or more processing operations are performed asynchronously, Alternatively, the one or more processing operations are performed in parallel.

In some embodiments, the time aligned video feeds include i) availability information that indicates respective video feeds included in the time aligned feeds that are available for consumption, and ii) access information that defines a level of access to grant to respective client devices requesting one or more of the time aligned feeds, wherein using the availability information and the access information, a receiving client device provides time-synchronized switching between one of: at least two encoded video segment files, at least two augmented video segment files, and at least one of the encoded video segment files and at least one of the augmented video segment files, within a respective temporal group.

In some embodiments, the client device is configured to select at least one of the encoded video segment file and the augmented video segment file based on at least the availability information and the access information, an amount of video playback buffering available, and a semantic understanding of the filmed occurrence depicted in the video feed.

In some embodiments, the augmentation process operation includes adding at least one of graphics, audio, text, and player tracking data to a video segment file to be augmented based on semantic analysis of the at least one video segment file. In some of these embodiments, the filmed occurrence is a sporting competition and the semantic understanding of the sporting competition includes at least one of a change in possession, a timeout, a change in camera angle, and a change in point-of-view.

In some embodiments, the client device executes a client application that is configured to receive the time aligned video feed and to switch playback among the plurality of video segment files and the at least one augmented video segment file within a temporal group can be grouped without temporal interruption.

In some embodiments, the temporal groups are used to provide a collection of at least two of time aligned video and data feeds for combined processing.

According to some embodiments of the present disclosure, a method for displaying content on a client device is disclosed, The method includes receiving a video feed corresponding to a filmed occurrence from an external resource, The method also includes receiving a spatio-temporal index corresponding to the filmed occurrence from the external resource, wherein the spatio temporal index indexes information relating to events and objects captured in the video feed as a function of respective video frames in which the events and objects are detected, The method also includes outputting a video corresponding to the video feed via a user interface of the client device, The method also includes receiving a user command via the user interface to display augmented content, wherein the command is received while a particular video frame is being displayed, The method further includes querying the spatio-temporal index using a frame identifier of the particular video frame to determine particular information that is relevant to the particular video frame, The method further includes obtaining the particular information, augmenting the video with the particular information to obtain an augmented video, and displaying the augmented video via the user interface.

In embodiments, the spatio-temporal index further indexes the information as a function of respective locations within the video frames and the user command further indicates a particular location corresponding to the particular video frame.

In embodiments, the spatio-temporal index is queried using the particular location in addition to the frame identifier to obtain the particular information. In some of these embodiments, the particular location corresponds to a pixel location on the user interface where an indexed object was depicted in the particular video frame, and wherein the particular information relates to the indexed object, In some of these embodiments, the indexed object is a participant in the filmed occurrence, and the particular information includes statistics relating to the participant, In some of these embodiments, the indexed object is a playing surface on which the filmed occurrence is being played, and the particular information indicates one or more participants depicted in the particular frame, In some of these embodiments, the indexed object is an advertisement being displayed in the video feed, and the particular information relates to the advertisement, In some of these embodiments, the particular location corresponds to one or more pixels. In some of these embodiments, the particular location is defined with respect to a playing surface depicted in the video feed.

In some embodiments, the particular information indicates one or more participants depicted in the particular frame.

According to some embodiments of the present disclosure, a method for aligning video feeds is presented, The method includes receiving a broadcast video feed capturing a filmed occurrence, the broadcast video feed comprising a plurality of broadcast video frames captured by a broadcast camera, wherein the broadcast video feed is a video feed that is consumable by a client device, The method further includes receiving a tracking camera video feed corresponding to the filmed occurrence, the tracking camera video feed comprising a plurality of tracking video frames and being captured by a tracking camera having a tracking camera position that is calibrated to a fixed frame of reference, The method also includes time-aligning the broadcast video feed with the tracking video feed and tracking one or more respective pixel locations of the fixed frame of reference in one or more respective broadcast video frames of the broadcast video feed, The method also includes calibrating a broadcast camera position of the broadcast camera based on the respective pixel locations of the fixed frame of reference in the one or more respective broadcast video frames and the calibration of the tracking camera position of the tracking camera, The method further includes spatially aligning the broadcast video feed with the tracking video feed based on the tracking camera position and the broadcast tracking video, The method also includes generating a spatio-temporal index corresponding to the filmed occurrence based on the spatial alignment and the time-alignment of the first broadcast video feed with the tracking video feed, wherein the spatio-temporal index indexes spatio-temporal information relating to objects detected in the broadcast video feed and/or the tracking video feed.

In embodiments, the composition of video via frames, layers and/or tracks may be generated interactively by distributed sources, e.g., base video of the sporting event, augmentation/information layers/frames from different providers, audio tracks from alternative providers, advertising layers/frames from other providers, leveraging indexing and synchronization concepts, and the like. By way of this example, the base layers and/or tracks may be streamed to the various providers as well as to the clients. In embodiments, additional layers and/or tracks may be streamed directly from the providers to the clients and combined at the client. In embodiments, the composition of video via frames, layers and/or tracks and combinations thereof may be generated interactively by distributed sources and may be based on user personalizations.

In embodiments, the systems and methods described herein may include a software development kit (SDK) that enables content being played at a client media player to dynamically incorporate data or content from at least one separate content feed, In these embodiments, the SDK may use timecodes or other timing information in the video to align the client's current video playout time with data or content from the at least one separate content feed 4802, in order to supply the video player with relevant synchronized media content.

A system (e.g., the system described herein) may output one or more content feeds Feeds 1 . . . n. The content feeds may include video, audio, text, and/or data (e.g., statistics of a game, player names). In some embodiments, the system may output a first content feed F-1 that includes a video and/or audio that is to be output (e.g., displayed) by a client media player. The client media player 4808 may be executed by a user device (e.g., a mobile device, a personal computing device, a tablet computing device, and the like). The client media player is configured to receive the first content feed and to output the content feed via a user interface (e.g., display device and/or speakers) of the user device. Additionally, or alternatively, the client media player 4808 may receive a third-party content feed from a third-party data source (not shown). For example, the client media player may receive a live-game video stream from the operator of an arena. Regardless of the source, a content feed F-2, or Fn may include timestamps or other suitable temporal indicia to identify different positions (e.g., frames or chunks) in the content feed. The client media player may incorporate the SDK. The SDK 4804 may be configured to receive additional content feeds F-2 . . . . Fn to supplement the outputted media content. For example, a content feed FG-2 may include additional video (e.g., a highlight or alternative camera angle). In another example, a content feed F-2 may include data (e.g., statistics or commentary relating to particular game events). Each additional content feed F-2 . . . . Fn-N may include timestamps or other suitable temporal indicia as well. The SDK may receive the additional content feed(s) F-2 . . . . Fn and may augment the content feed being output by the media player with the one or more additional content feeds F-2 . . . . Fn based on the timestamps of the respective content feeds F-1, F2, . . . . Fn to obtain dynamic synchronized media content 4810. For example, while playing a live feed (with a slight lag) or a video-on-demand (VOD) feed of a basketball game, the SDK may receive a first additional content feed containing a graphical augmentation of a dunk in the game and a second additional content feed 4802 indicating the statistics of the player who performed the dunk. The SDK may incorporate the additional content feeds into the synchronized media content, by augmenting the dunk in the live or VOD feed with the graphical augmentation and the statistics. In some embodiments, a client app using the SDK may allow client-side selection or modification of which subset of the available additional content feeds to incorporate. In some implementations, the SDK may include one or more templates that define a manner by which the different content feeds may be laid out. Furthermore, the SDK may include instructions that define a manner by which the additional content feeds are to be synchronized with the original content feed.

In some embodiments, the systems and methods disclosed herein may include joint compression of channel streams such as successive refinement source coding to reduce streaming bandwidth and/or reduce channel switching time, and the like.

In some embodiments, the systems and methods disclosed herein may include event analytics and/or location-based games including meta-games, quizzes, fantasy league and sport, betting, and other gaming options that may be interactive with many of the users at and connected to the event such as identity-based user input, e.g., touching or clicking a player predicted to score next. In embodiments, the event analytics and/or location-based games may include location-based user input such as touching or clicking a location where a rebound or other play or activity is expected to be caught, to be executed, and the like. In embodiments, the event analytics and/or location-based games may include timing-based user input such clicking or pressing a key to indicate when a user thinks a shot should be taken, a defensive play should be initiated, a time-out should be requested, and the like. In embodiments, the event analytics and/or location-based games may include prediction-based scoring including generating or contributing to a user score based on the accuracy of an outcome prediction associated with the user. By way of this example, the outcome prediction may be associated with outcomes of individual offensive and defensive plays in the games and/or may be associated with scoring and/or individual player statistics at predetermined time intervals (e.g., quarters, halves, whole games, portions of seasons, and the like). In embodiments, the event analytics and/or location-based games may include game state-based scoring including generating or contributing to a user score based on expected value of user decision calculated using analysis of instantaneous game state and/or comparison with evolution of game state such as maximum value or realized value of the game state in a given chance or possession.

In some embodiments, the systems and methods disclosed herein may include interactive and immersive reality games based on actual game replays. By way of this example, the interactive and immersive reality games may include the use of one or more simulations to diverge from actual game events (partially or in their entirety) based on user input or a collection of user input. In embodiments, the interactive and immersive reality games may include an action-time resolution engine that may be configured to determine a plausible sequence of events to rejoin the actual game timeline relative to, in some examples, the one or more simulations to diverge from actual game events (partially or in their entirety) based on user input or a collection of user input. In embodiments, the interactive and immersive reality games may include augmented reality simulations that may integrate game event sequences, using cameras on located on one or more backboards and/or along locations adjacent to the playing court. In embodiments, the systems and methods disclosed herein may include simulated sports games that may be based on detailed player behavior models. By way of this example, the detailed player behavior models may include tendencies to take different actions and associated probabilities of success of different actions under different scenarios including teammate/opponent identities, locations, score differential, period number, game clock, shot clock, and the like.

DETAILED DESCRIPTION OF THE DRAWINGS

A more specific example of a golf simulator that can be used to feed metrics into the system of the present invention is described in US Patent Publication Document No. 20200038742 (Van Wagoner) as follows, with reference to FIGS. 1, 2 and 3.

Figure 2:
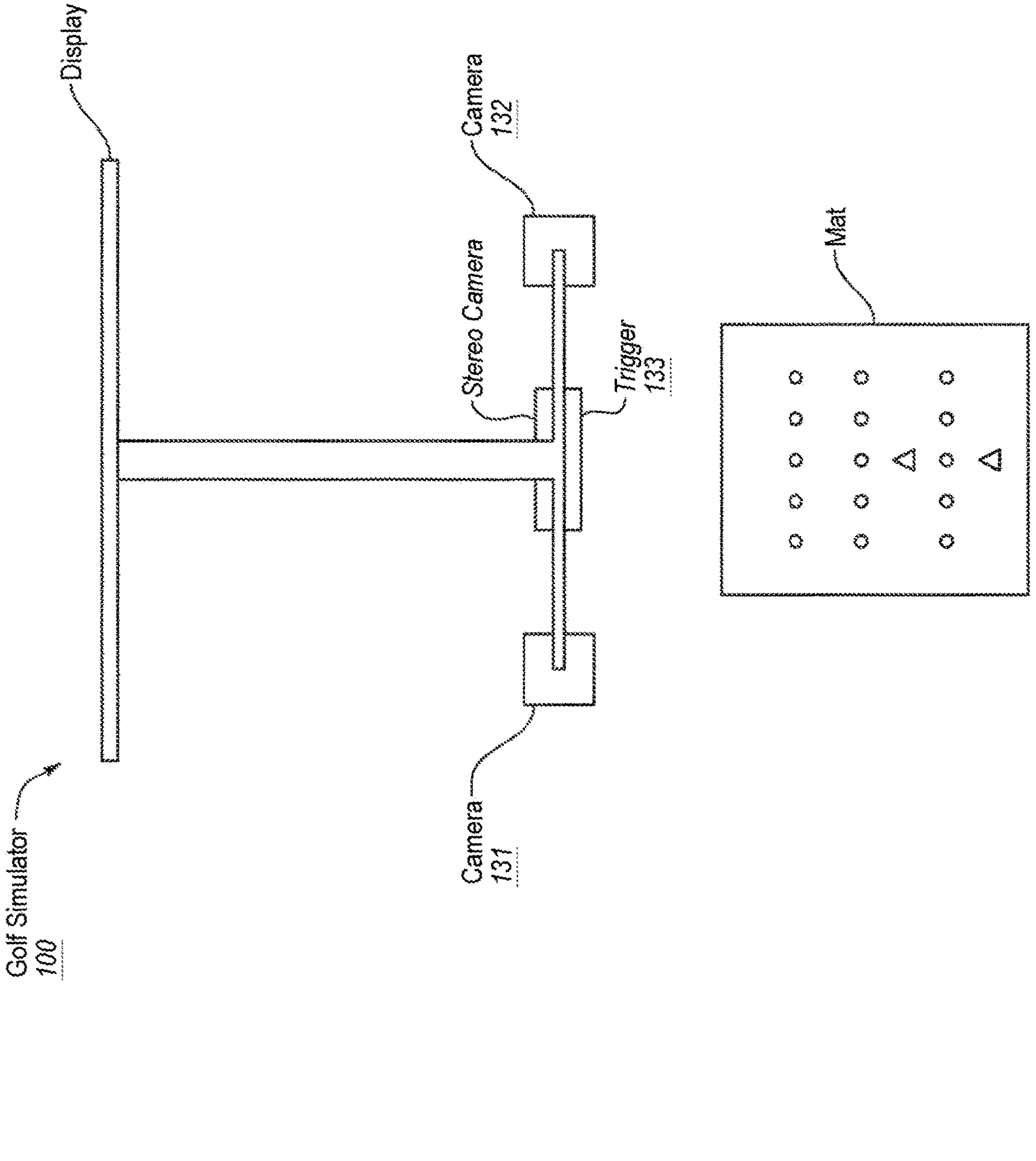
FIG. 2 is a top-down view of the golf simulator of FIG. 1, in accordance with an embodiment of the disclosure.

FIGS. 1 and 2 illustrate an embodiment of a golf simulator system 100 from an isometric and top-down perspective, respectively, in accordance with an embodiment of the disclosure. The golf simulator system 100 includes a playing surface 110, a hitting mat 120, an image capture system 130, a computer 140, and a display 150. The golf simulator system 100 may optionally include an enclosure, but none is shown. The playing surface 110 may be a stage or collapsible/expandable stage that has a top surface several inches to a foot above the floor, and may comprise synthetic grass or other material.

In one embodiment, the display 150 may include a projector configured to project images onto a screen. The display 150 may be operably coupled to the computer 140. Image data may be generated by the computer 140 and provided to the projector device for projection onto the screen. In other embodiments, the display 150 may be a liquid crystal display, plasma display, or rear-project display.

The image capture system 130 may include a left camera 131, a right camera 132, and a trigger 133. The image capture system 130 may be positioned by a support structure over the playing surface 110 so that the field of view captured by the cameras 131 and 132 includes the playing surface 110, hitting mat 120, and at least part of the likely flight path of a physical golf ball. The left camera 131, the right camera 132 and the trigger 133 may be arranged in a stereoscopic manner. In various embodiments of the disclosure the cameras 131 and 132 are digital cameras, preferably selected to have consistent, repeatable exposure periods.

The image capture system 130 may be operably coupled to the computer 140. Control signals for the image capture system 130, and more particularly the left camera 131, right camera 132 and trigger 133 may be generated by the computer 140 and communicated to the image capture system 130. The control signals may be related to any number of features and functions of the image capture system 130. In various embodiments of the disclosure, control signals are provided during a set-up process and are indicative of an exposure time of the left camera 131 and right camera 132. In one embodiment, the control signals may include shutter speed that would affect the exposure time of the cameras.

The trigger 133 may be configured to generate and communicate a control signal responsive to which the left camera 131 and the right camera 132 capture an image or images. In various embodiments, the trigger 133 is an asynchronous device, such as a motion sensor, that is positioned and configured to detect the motion of a physical golf ball, and to generate and communicate a control signal to the two cameras based on the aforementioned detection. In one embodiment, the trigger 133 is line photo-sensors behind a lens. In another embodiment, the trigger 133 may be a camera.

Upon receiving a control signal from the trigger 133, the cameras 131 and 132 may be configured to capture images. Each camera 131 and 132 may include a memory to store the captured images. In another embodiment, the cameras 131 and 132 may share a memory with allocated memory addresses for each camera. The computer 140 may be connected to the memory and configured to retrieve the stored image(s). In various embodiments of the disclosure, each time new images are stored in the memory, the new images overwrite any old images.

As mentioned above, the image capture system 130 may be operably coupled to the computer 140. Image capture data captured by the image capture system 130 may be transmitted to the computer 140. The image capture data may be streamed in real time or transferred after it is captured. In one embodiment, the computer may read image capture data direct from a camera to a memory for processing. In one embodiment, the image capture data may be formatted and stored (e.g., for later use), and the format of the stored image capture data may be one of MPEG, AVI, WMV, or MOV, or some other video format. In another embodiment, the format of the stored image capture data may be one of BITMAP, JPEG, TIFF, PNG, GIF, or in some other image format.

Figure 3:
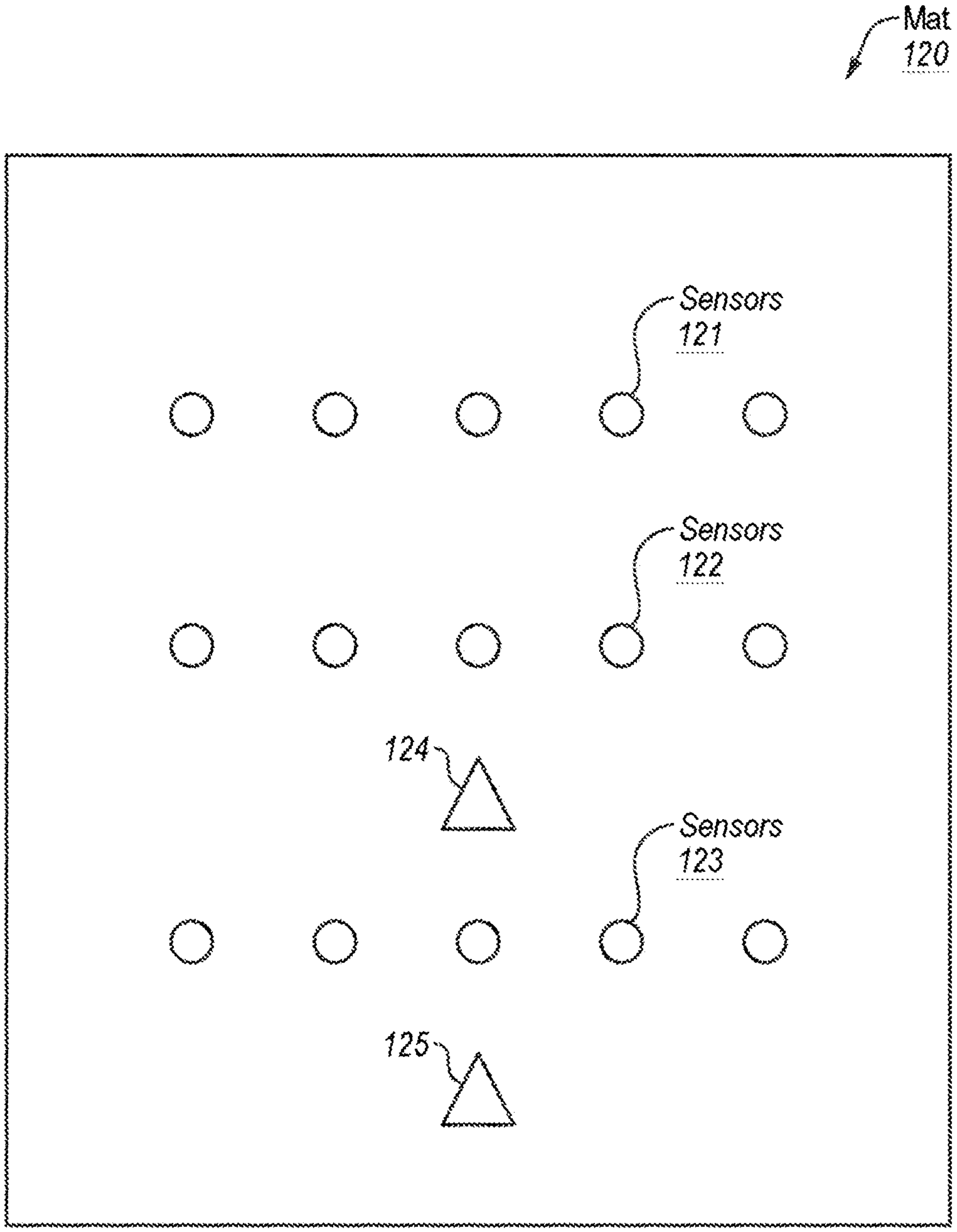
FIG. 3 is a top-down view of a hitting mat, in accordance with an embodiment of the disclosure.

FIG. 3 illustrates a hitting mat 120 according to an embodiment of the disclosure. In one embodiment, the hitting mat 120 is a rectangular box and it is disposed within the playing surface 110 such that a top surface of the hitting mat 120 is substantially flush with a top surface of the playing surface 110. Those of ordinary skill in the art will appreciate that the position of the hitting mat 120 may be adjusted such that the top surface of the hitting mat 120 is on a plane that is above or below the top surface of the playing surface 110, as well as adjusted to be at an angle relative to the top surface of the playing surface 110.

As illustrated in FIG. 3, the hitting mat 120 may include arrays of sensor arrays 121, 122 and 123, and also may include marker 124 and marker 125 for a physical golf ball to be placed. The hitting mat 120 may also include a control box 126 (FIG. 4) that includes control circuitry for the arrays of sensor arrays 121, 122 and 123. In various embodiments of the disclosure, each array of sensors includes five to ten sensors that may be arranged in a line, however, those of ordinary skill in the art will appreciate that the quantity and arrangement may be varied to accommodate different architectures and design constraints. In one embodiment, sensor array 121 and sensor array 122 are positioned forward (in terms of physical golf ball flight) of marker 124, and sensor array 123 is positioned behind marker 124 and forward of marker 125. In this embodiment, marker 125 is for putting, and triggering sensor array 123 indicates that a user is putting. In other embodiments, different sensor arrangements may be used, for example, a pressure sensor under marker 125, instead of or in addition to sensor array 123.

Figure 4:
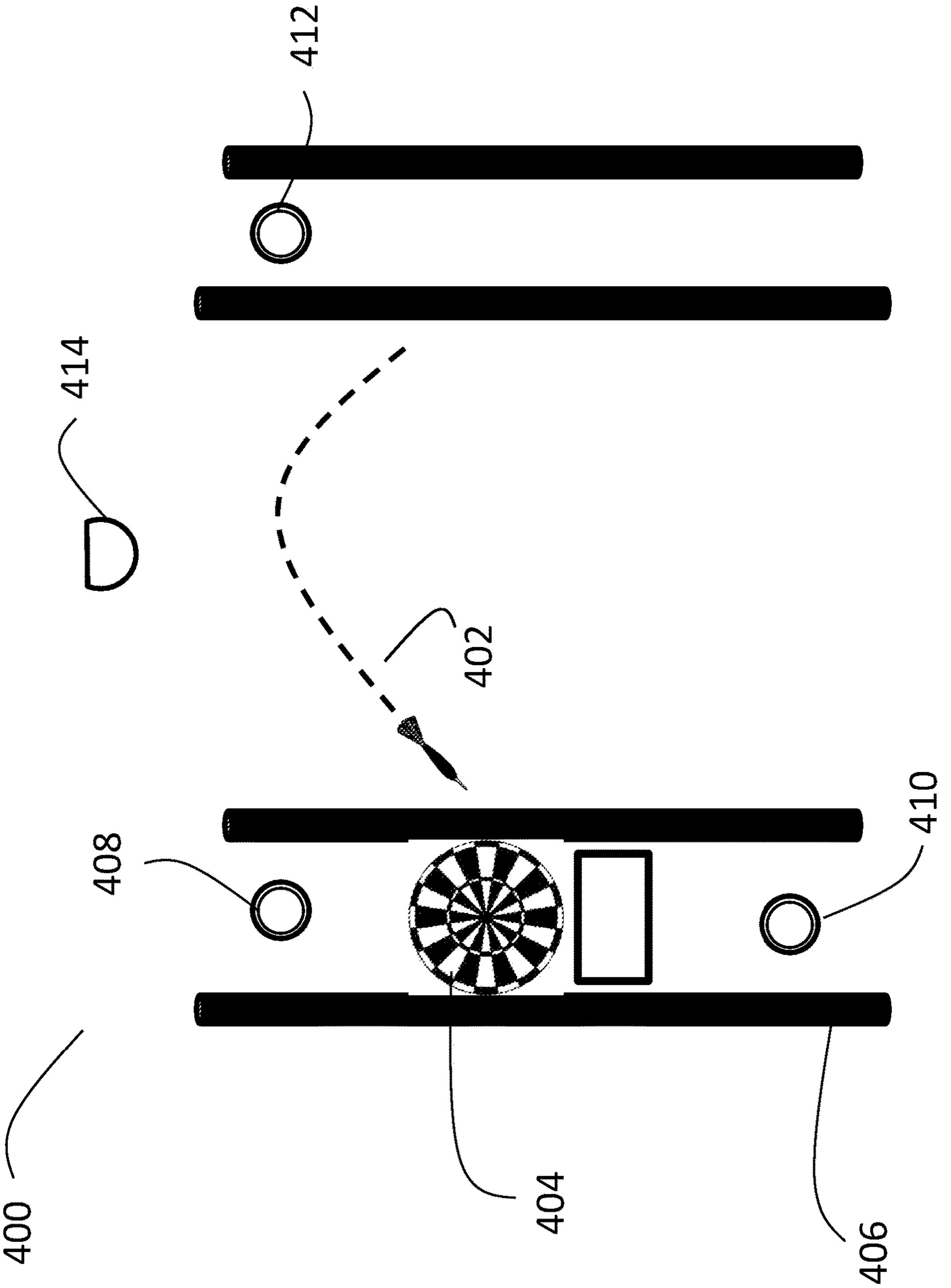
FIG. 4 is a side view of a dart arena with image capture devices to record a dart throwing event.

FIG. 4 shows a side view of a gaming image capture system 400 for a darts competition. The system 400 shows a dart trajectory 402 in the form of an arc towards a dart board 404. There are four general posts 406 defining a competition space. There are at least three image capture devices 408, 410 and 412 which can accurately define the total path, results and image of movement of the dart. It would be preferred to have each of the three image capture devices 408, 410 and 412 to have an opposed image capture device which offer greater detail and inherently more accurate image data to the server. Optionally, there is also a light emitter 414 over the dart trajectory 402 to assure that all possible data of the trajectory will be captured by the at least three image capture devices 408, 410 and 412. Any opposed image capture devices must be in phase with the at least three image capture devices, but may be preferably aligned out of parallel or out of perpendicularity with the at least three image capture devices so that greater detail on movement, without mere parallel duplication can be provided. This format could also be used with football tosses, baseball pitches and any other tossing, throwing or hitting accuracy.

The differently positioned image capture devices have their individual image data content integrated into coordinates that can be further analyzed to assure accuracy.

In another embodiment, control logic associated with the sensor arrays may be configured to detect the number of objects passing over the sensors to determine whether a full swing or a putting swing is being taken. For example, if one object passes over the arrays (the golf ball) then the control logic determines there was a putting swing. If two objects pass over the sensor arrays (a golf ball followed by a club head) then the control logic determines there was a full swing.

In operation of this example embodiment, the process may begin after the gaming system establishes a credit balance for a player (such as after an acceptor of the gaming system receives and validates physical currency or a physical ticket associated with a monetary value). The gaming system receives a game-initiation input (such as an actuation of a physical deal button or a virtual deal button via a touch screen) and, in response, places a wager on and initiates a play of a wagering game associated with a paytable, which may be used to assure a management profit, with payouts at slightly less than 1:1 (e.g., 75-95%). The paytable is determined based on the type of game being played and the wager (or in other embodiments the wagering game's denomination).

What is claimed is:

1. A method of executing a wagering event between at least two players, comprising:

sensing, utilizing at least one first sensor, a first physical sport activity player performing a first physical sport activity during a physical sport activity event;

recording, by a first sensor recording system, first sensed movement data of a first object resulting from the first physical sport activity player physically engaging the first object while participating in the physical sport activity event;

capturing first metric results of the movement of the first object caused by the first physical sport activity player physically engaging therewith;

transmitting the first metric results to a computing device configured to store the first metric results with a first identifier associated with the first physical sport activity player;

sensing, utilizing the at least one first sensor or at least one second sensor, a second physical sport activity player performing the physical sport activity during the physical sport event;

recording, by the first sensor recording system or a second sensor recording system, second sensed movement data of the first or a second object resulting from the second physical sport activity player physically engaging the first or second object while participating in the physical sport activity event;

capturing second metric results of the movement of the first or second object caused by the second physical sport activity player physically engaging therewith;

transmitting the second metric results to the computing device configured to store the second metric results with a second identifier associated with the second physical sport activity player, the first and second sport activity players further participating in a competitive wager for value to be executed by the computing device in response to receiving the first and second metric results; and receiving, from the computing device, a notification of a winner of the value of the competitive wager between the first and second physical sport activity players as determined by the computing device that compared the first and second metric results of the movement of the at least one of the first and second objects after completion of the physical sport activity event.

2. The method of claim 1, further comprising:

associating, by the computing device, date stamps with each transmission of the first and second metric results;

associating the respective date stamps and first and second metric results with respective sensed movements of the respective first and second objects when engaged by the first and second physical sport activity players; and storing, by the computing device, the first and second metric results and sensed movements with the respective date stamps.

3. The method of claim 1, further comprising comparing, by the computing device, the first metric results and second metric results using handicapping values for the respective first and second physical sport activity players.

4. The method of claim 3, wherein using the handicapping values includes using handicapping values including at least one of distance, speed, accuracy, time, and score.

5. The method of claim 1, wherein sensing the first and second sport activity players during a physical sport activity event includes sensing the first and second sport activity players while at a golf event.

6. The method of claim 5, wherein sensing includes visually recording the first and second sport activity players while swinging a physical golf club to strike a physical golf ball as the first or second object with movement.

7. The method of claim 6, wherein comprising:

measuring speed of a head of the physical golf club while being swung by the respective first and second sport activity players during the golf event; and measuring position at a moment of impact of the head of the physical golf club with the physical golf ball.

8. The method of claim 6, wherein capturing first and second metric results includes determining metrics based on:

(i) an amount of energy transferred from a head of the physical golf club to the physical golf ball, (ii) an amount of spin on the physical golf ball immediately after impact of the physical golf ball with the head of the physical golf club, (iii) an angle at which the physical golf ball separates from the head of the physical golf club, (iv) an estimate as to how far the physical golf ball would travel in air under defined ambient conditions, (v) physical golf ball speed immediately after the golf ball separates from the head of the physical golf club, (vi) a speed of the head of the physical golf club at impact with the physical golf ball, (vii) an amount of loft on a head face of the head of the physical golf club at a time of impact with the physical golf ball, (viii) an amount of loft on the head face of the physical golf club at the time of impact with the physical golf ball, and (ix) a face angle of the head face of the head of the physical golf club.

9. The method of claim 8, further comprising comparing multiple events represented by first and second metric results for the respective first and second sport activity players to assure that repeated first and second metric results are not used in multiple wagering events.

10. The method of claim 1, wherein capturing first and second metric results of the movement of the first and second objects caused by respective first and second physical sport activity players includes capturing first and second metric results by the first and second activity players when using a stationary cycling apparatus and based on measurements of pedal speed, pedal resistance, and time.

11. The method of claim 1, wherein capturing first and second metric results of the movement of the first and second objects caused by respective first and second physical sport activity players includes capturing first and second metric results by the first and second activity players when shooting a basketball into a hoop and based on respective scores attained by a number of successful shots made.

12. The method of claim 1, further comprising randomly selecting the recorded first sensed movement data of the first physical sport activity player and first metric results and the recorded second sensed movement data of the second sport activity player and second metric results to compete against each other.

13. The method of claim 12, wherein randomly selecting is limited within ranges of handicapped abilities of the first sport activity player and the second physical sport activity player.

14. The method of claim 12, wherein randomly selecting is in response to a command to the computing device performed by the first sport activity player and the second sport activity player.

15. The method of claim 1, further comprising determining, by the computing device, a winner of the competitive wager by a direct comparison of the first and second metric results.

16. The method of claim 1, further comprising enabling the first and second metric results and associated first and second sensed movement data to be accessed by each of the first and second physical sport activity players after determining a winner of the value of the wager.

17. The method of claim 16, further comprising:

communicating at least one of the first and second sensed movement data of the first and second physical sport activity player to a client device of at least one of the first and second physical sport activity player;

receiving a spatiotemporal index corresponding to the sensed occurrence from the computing device, wherein the spatiotemporal index indexes information relating to events and objects captured in a sensor feed as a function of respective sensor frames in which the respective physical sport activity events and first and second objects are detected; and outputting a data corresponding to the sensor feed via a user interface of the first and second physical sport activity player devices, thereby enabling the first and second physical sport activity players to display the sensor feed in response to receiving a user command to display the sensor feed.

18. A method of executing a wagering event between at least two players, said method comprising:

visually capturing first video content of a first physical sport activity player, by a visual recording system having at least two digital cameras, performing a physical sport activity in which there is movement of a first object in the physical sport activity while the first object is in view of the at least two digital cameras with a combined range of view that encompasses physical activities of the first player in causing the movement of the first object in the physical sport activity;

capturing first metric results of the movement of the first object caused by the first physical sport activity player physically engaging therewith;

recording the captured first video content of the movement of the first object in the physical sport activity within the combined range of view of the at least two digital cameras for the first physical sport activity player and the corresponding metric results;

transmitting as data the captured first video content and the corresponding metric results in which there is movement of the first object in the physical sport activity for the first physical sport activity player to a computing device for storage thereby with an electronically readable name associated with the first physical sport activity player;

visually capturing second video content of a second physical sport activity player, by the same or different visual recording system having at least two digital cameras, performing the physical sport activity in which there is movement of a second object with a same or different visual recording system having at least two digital cameras with a combined range of view that encompasses physical activities of the second player in causing the movement of the second object in the physical sport activity;

capturing second metric results of the movement of the second object caused by the second physical sport activity player physically engaging therewith;

transmitting as data the captured second video content and the second metric results for the movement of the second object in the physical sport activity of the second physical sport player to the computing device for storage thereby with an electronically readable name associated with the second physical sport player;

enabling, by the computing device, for each of the first physical sport activity player and the second physical sport activity player to agree to a competitive wager for value determined by the computing device by comparing the first and second metrics for movement of the first and second objects caused by the respective first and second physical sport activity players to determine a winner by a direct comparison of the first and second metrics of the value of the competitive wager; and notifying, by the computing device, the first and second physical sport activity players which was the winner of the competitive wager.

19. The method of claim 18, wherein visually capturing first and second video content includes visually capturing the physical sport activity that includes hitting physical golf balls as the movement of the first and second objects.

20. The method of claim 18, wherein visually capturing first and second video content includes visually capturing the physical sport activity that includes shooting physical basketballs into a hoop as the movement of the first and second objects.

* * * * *